US011698383B2

(12) United States Patent
Roels et al.

(10) Patent No.: US 11,698,383 B2
(45) Date of Patent: Jul. 11, 2023

(54) DEVICE AND METHOD FOR MOUNTING A SENSOR ON A SURFACE

(71) Applicant: Rivian IP Holdings, LLC, Plymouth, MI (US)

(72) Inventors: Quinn Roels, Normal, IL (US); Timothy Atkinson, Kankakee, IL (US)

(73) Assignee: Rivian IP Holdings, LLC, Irvine, CA (US)

( * ) Notice: Subject to any disclaimer, the term of this patent is extended or adjusted under 35 U.S.C. 154(b) by 22 days.

(21) Appl. No.: 17/491,903

(22) Filed: Oct. 1, 2021

(65) Prior Publication Data

US 2023/0103815 A1    Apr. 6, 2023

(51) Int. Cl.
  *G01P 1/00*    (2006.01)
  *G01C 9/34*    (2006.01)
  *G01P 15/18*   (2013.01)

(52) U.S. Cl.
  CPC .................. *G01P 1/00* (2013.01); *G01C 9/34* (2013.01); *G01P 15/18* (2013.01)

(58) Field of Classification Search
  CPC ....................................................... G01P 1/00
  USPC ............................................................ 73/493
  See application file for complete search history.

(56) References Cited

U.S. PATENT DOCUMENTS 4,112,584 A * 9/1978 Kooi ........................ G01C 9/28
                                                        33/275 R

FOREIGN PATENT DOCUMENTS

EP          0145125 A2 *  6/1985  ............... G01B 7/30
WO    WO-2020049100 A1 *  3/2020  .......... G01P 15/0922

* cited by examiner

*Primary Examiner* — Walter L Lindsay, Jr.
*Assistant Examiner* — Philip T Fadul
(74) *Attorney, Agent, or Firm* — Clements Bernard Walker; Christopher L. Bernard

(57) ABSTRACT

A sensor mounting device and method to accurately mount a sensor to a test asset for data collection and component validation, the sensor mounting device including a leveling plate equipped with a level indicator, an alignment shelf adapted to constrain the movement of a sensor and hold the sensor level relative to the level indicator, and various protruding structures for aligning the mounting device with the test asset. The sensor mounting device may further include a base structure to support the leveling plate and allow a user to adjust the vertical position of the sensor to be mounted. The base structure may include a plurality of spanning members on which the leveling plate is mounted as to allow the leveling plate to be adjusted vertically.

19 Claims, 8 Drawing Sheets

DEVICE AND METHOD FOR MOUNTING A SENSOR ON A SURFACE

INTRODUCTION

The present disclosure relates generally to the automotive field and vehicle component manufacturing and testing. More particularly, the present disclosure relates to a sensor mounting device used to mount a sensor on a surface, such as for the testing or monitoring of a vehicle component.

Sensors are widely used in the manufacturing and testing industries to acquire data for component validation and analysis. To obtain accurate test data it is important to make certain that the sensor is precisely mounted to the desired test asset. Tri-axial accelerometers are one example of many different kinds of sensors that are used to collect data, such as in the vibration testing of a battery pack, for example. These accelerometers must be accurately mounted in line with the XYZ axes of the test asset as well as the global XYZ axes to ensure that the output data is useful and free of errors.

The present background is provided as illustrative environmental context only. It will be readily apparent to those of ordinary skill in the art that the principles and concepts of the present disclosure may be implemented in other environmental contexts equally, without limitation.

SUMMARY

In general, the present disclosure provides a sensor mounting device and method to accurately mount a sensor to a test asset for data collection and component validation. The present disclosure provides a sensor mounting device that includes a leveling plate equipped with a level indicator, an alignment shelf adapted to constrain the movement of a sensor and hold the sensor level relative to the level indicator, and various protruding structures for aligning the mounting device with the test asset. This mounting device may further include a base structure to support the leveling plate and allow a user to adjust the vertical position of the sensor to be mounted. The base structure may include a plurality of spanning members on which the leveling plate is mounted as to allow the leveling plate to be adjusted vertically.

In one illustrative embodiment, the present disclosure provides a sensor mounting device for mounting a sensor on a surface of a monitored structure, including: a leveling plate having a rear face adapted to be disposed facing towards the surface of the monitored structure and a front face adapted to be disposed facing along or away from the surface of the monitored structure; an alignment shelf coupled to the rear face of the leveling plate and adapted to retain the sensor during mounting to the surface of the monitored structure; and a level indicator coupled to the leveling plate and visible from the front face of the leveling plate. The level indicator is operable for ensuring that the leveling plate is level in at least one axis with respect to the surface of the monitored structure. The alignment shelf includes an angle bracket that is adapted to constrain movement of the sensor with respect to the leveling plate in at least one direction along each of two perpendicular axes.

In another illustrative embodiment, the present disclosure provides a method for mounting a sensor on a surface of a monitored structure, including: coupling the sensor to a sensor mounting device including a level indicator in a constrained alignment; disposing the sensor mounting device adjacent to the surface of the monitored structure with the level indicator indicating that the sensor mounting device is level in at least one axis with respect to the surface of the monitored structure; affixing the sensor to the surface of the monitored structure; and withdrawing the sensor mounting device while leaving the sensor affixed to the surface of the monitored structure. The sensor mounting device further includes: a leveling plate having a rear face adapted to be disposed facing towards the surface of the monitored structure and a front face adapted to be disposed facing along or away from the surface of the monitored structure; and an alignment shelf coupled to the rear face of the leveling plate and adapted to retain the sensor during mounting to the surface of the monitored structure; wherein the level indicator is coupled to the leveling plate and is visible from the front face of the leveling plate. The alignment shelf includes an angle bracket that is adapted to constrain movement of the sensor with respect to the leveling plate in at least one direction along each of two perpendicular axes.

In a further illustrative embodiment, the present disclosure provides a sensor mounting device for mounting a sensor on a surface of a monitored structure, including: a leveling plate having a rear face adapted to be disposed facing towards the surface of the monitored structure and a front face adapted to be disposed facing along or away from the surface of the monitored structure; an alignment shelf coupled to the rear face of the leveling plate and adapted to retain the sensor during mounting to the surface of the monitored structure; and a level indicator coupled to the leveling plate and visible from the front face of the leveling plate; wherein the alignment shelf and the leveling plate are collectively adapted to constrain movement of the sensor with respect to the leveling plate in at least one direction along each of three orthogonal axes. The alignment shelf includes one of an angle bracket and a curved bracket.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Figure 1:
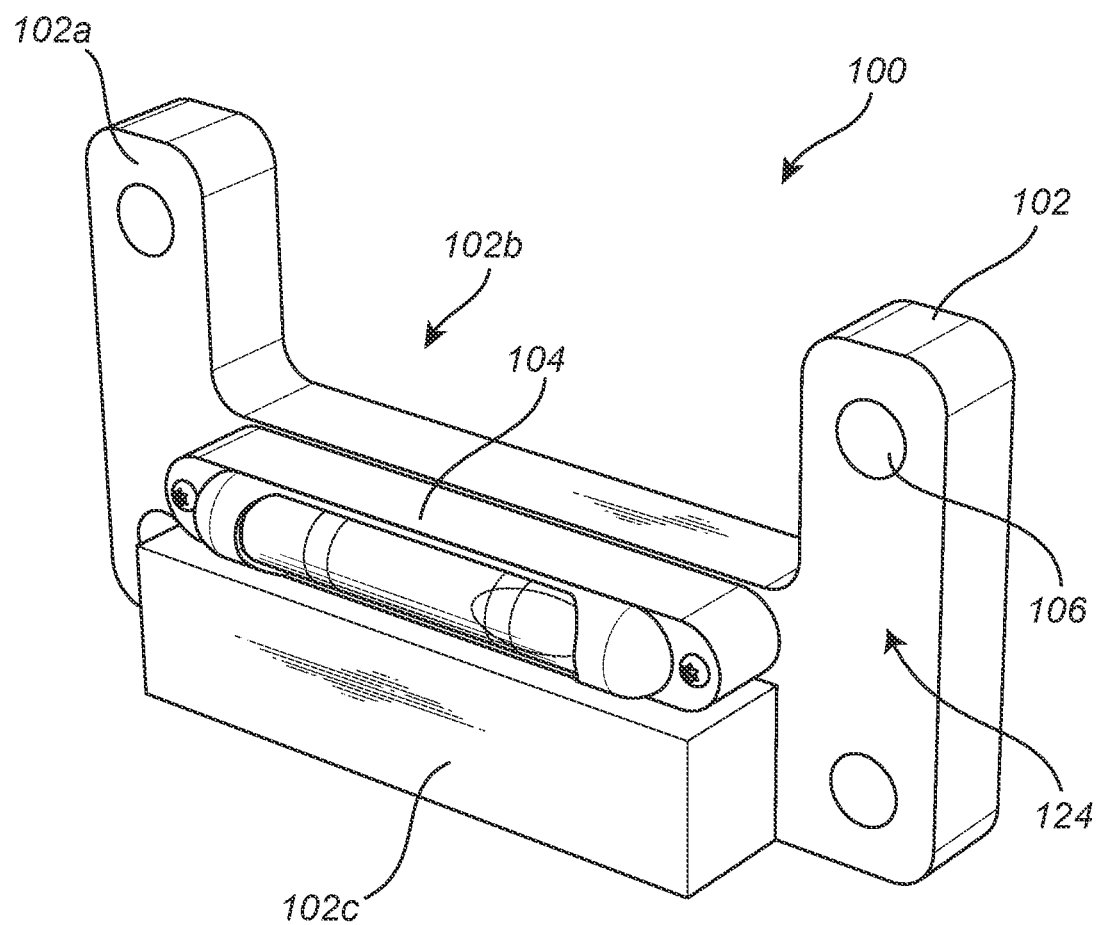
FIG. 1 is a front perspective view of one illustrative embodiment of the sensor mounting device of the present disclosure.

Again, the present disclosure provides a sensor mounting device and method to accurately mount a sensor to a test asset for data collection and component validation. The present disclosure provides a sensor mounting device that includes a leveling plate equipped with a level indicator, an alignment shelf adapted to constrain the movement of a sensor and hold the sensor level relative to the level indicator, and various protruding structures for aligning the mounting device with the test asset. This mounting device may further include a base structure to support the leveling plate and allow a user to adjust the vertical position of the sensor to be mounted. The base structure may include a plurality of spanning members on which the leveling plate is mounted as to allow the leveling plate to be adjusted vertically.

Sensors are widely used in manufacturing, testing, research, and development, and are utilized with most mechanical and electronics modules on the market. They are an extremely important tool for data collection and support the functionality of most mechanical and electronic devices, such as the mechanical and electronic systems in vehicles. In a testing environment, for example, accelerometers are widely used to monitor components or structures as they go through specific analysis in the developmental stages. Such tests are comprehensively performed on various vehicle components to validate and understand the characteristics of each system as a whole. For example, vibration testing is widely performed on vehicle components to monitor the behavior of sensitive equipment. Vibration typically appears because of the dynamic effects of manufacturing tolerances, clearances, rolling, and rubbing contact between parts, and out-of-balance forces in rotating and reciprocating members. Because of how different components interact in a system, small minor vibrations can excite a resonant frequency of some other structural or sensitive part and be amplified into major vibrations. Thus, it is important to vibration test various vehicle components, such as battery modules or packs and the like, to determine how these vehicle components will behave when exposed to repeated vibration cycles of predetermined periods of time—ensuring that performance is not degraded, and failure does not occur. Often, vibration tests are performed by securing a battery module or pack or the like to a vibration table, with the battery module or pack or the like equipped with exterior sensors, such as tri-axial accelerometers or the like. During such testing, it is important that the accelerometers are secured to the exterior surface of the battery module or pack in coaxial alignment with the vibration table.

The sensor mounting device of the present disclosure allows a user to install a sensor on the surface of a test asset or another monitored surface. This sensor may be permanently or temporarily mounted for ongoing monitoring or testing and validation purposes, respectively. The sensor mounting device of the present disclosure ensures consistent sensor mounting in a predetermined, level alignment, with the XYZ axes of the sensor aligned with the XYZ axes of the component and vibration table, for example, such that angle offsets do not have to be determined and accounted for in the subsequent measurements.

Conventional sensor mounting methods used for attaching sensors to monitored surfaces include stud mounts, magnetic mounts, and adhesive, all of which address affixing a sensor to a surface, but not aligning the sensor with the surface in an accurate and repeatable manner. The importance of accurately mounting sensors such as accelerometers is directly related to the desired accuracy of data to be collected. For example, tri-axial accelerometers must be mounted to the monitored structure with the axes of the accelerometer in line with the axes of the monitored structure. Any deviation in these axes may result in increased computational complexity, corrupt test data, and unknown discrepancies.

Stud mounts offer a very secure attachment to the monitored structure, which results in accurate data and repeatability. However, it is extremely difficult to line up such stud mounts appropriately with tri-axial accelerometers and these stud mounts require specific hardware for each sensor, resulting in extra cost and time spent. Magnetic mounts and adhesives offer a versatile temporary or permanent mounting system for rapid measurements and a quick means of attaching a sensor. Again, this requires a user to line up the axes of the tri-axial accelerometer in line with the axes of the monitored structure to collect accurate data. The magnetic mounts and adhesives themselves do nothing to address this alignment issue, and merely provides methods for ultimate fixation.

The sensor mounting device of the present disclosure may accommodate any of these mounting methods, while also making sure that the sensor is accurately placed and aligned. In the case of a tri-axial accelerometer, it allows the user to mount the sensor while verifying that it is aligned predictably and accurately in at least one axis relative to the monitored structure.

Referring now specifically to FIG. 1, a front perspective view of the sensor mounting device 100 of the present disclosure is shown. The sensor mounting device 100 includes a leveling plate 102 that makes up the body of the sensor mounting device 100, also including a level indicator 104. In the illustrative embodiment provided, the leveling plate 102 is an elongate planar structure, optionally including one or more tabs 102a, one or more cutouts 102b, and/or one or more shelf structures 102c. The leveling plate is manufactured from a substantially rigid material, such as a metal or plastic material, and is configured such that it may be grasped by the user. The level indicator 104 may be fixed to the front face 124 of the leveling plate 102 via screws, glue, and/or any other rigid connection. The level indicator 104 may include any conventional or novel device that indicates the inclination of the level indicator 104 and leveling plate 102 in a given plane, such as a fluid-filled bubble level, a pendulum level, an electronic level, etc., all well known to those of ordinary skill in the art. For example, in the case of the bubble level illustrated, a bubble disposed within a fluid tube will rest between provided visual marks when the level indicator 104 and leveling plate 102 are held parallel to the ground plane, which may also be the plane of a vibration table or the like. A plurality of fastening holes 106 are arranged along the two sides of the leveling plate 102. The plurality of fastening holes 106 are disposed through the leveling plate 102 to allow the sensor mounting device 100 to be fastened to another structure, such as a base, as described in greater detail herein below.

In various embodiments, the level indicator 104 is present to indicate when the leveling plate 102 is level in at least one axis with respect to global XYZ axes. In many cases it is important to mount sensors with a reference to the global axes to collect accurate data and remove unknown variables, with minimum computational complexity. This is both important for sensors being used for testing/validation procedures, as well as sensors being mounted permanently to various structures. Sensors mounted to components, such as ones installed in vehicles, may serve a very important role in the functionality and safety of the product.

The sensor mounting device 100 of the present disclosure may be manufactured from a 3D printed polymer, but may alternatively be manufactured from any suitable rigid material. The sensor mounting device 100 of the present embodiment is designed to be handheld, but as is described in greater detail herein below, it may also be mounted to a base for additional support and more accurate, repeatable vertical alignment with respect to the surface to which the sensor is to be mounted, especially when the component is disposed on a vibration table or the like.

Figure 2:
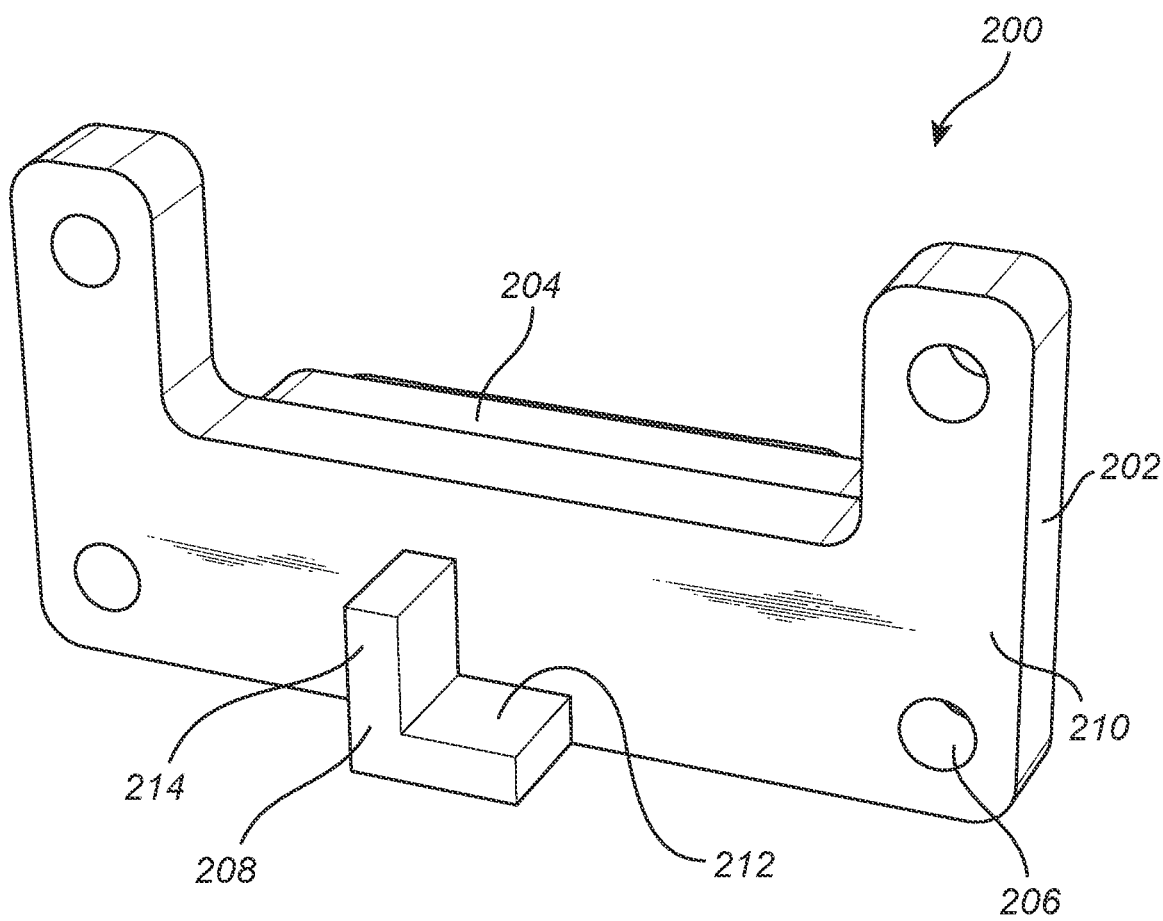
FIG. 2 is a rear perspective view of one illustrative embodiment of the sensor mounting device of the present disclosure.

Referring now specifically to FIG. 2, a rear perspective view of the sensor mounting device 200 of the present disclosure is shown. The leveling plate 202 again includes the level indicator 204. The level indicator 204 is again fixed to the front face 124 (FIG. 1) of the leveling plate 202 via screws, glue, and/or any other form of rigid connection. A plurality of fastening holes 206 are again arranged along the two sides of the leveling plate 202. The plurality of fastening holes 206 are disposed through the leveling plate 202 to allow the sensor mounting device 200 to be fastened to another structure, such as a base.

As illustrated here, an alignment shelf 208 is positioned on the rear face 210 of the sensor mounting device 200, opposite the front face 124 of the sensor mounting device 200. The alignment shelf 208 is designed to hold a sensor, such as an accelerometer, in this case a cube shaped accelerometer, and constrain its motion in at least one axis with respect to the leveling plate 202. The alignment shelf 208 includes an angle bracket that includes a bottom member 212 and a side member 214 that both extend from the rear face 210 of the leveling plate 202. The bottom member 212 is manufactured to be level relative to the level indicator 204 at level thus assuring that when an accelerometer is placed on the alignment shelf 208, the accelerometer and the level indicator 204 are uniform in at least one axis, such as the longitudinal axis of the leveling plate 202. This ensures that when the level indicator 204 signifies that it is level, the accelerometer will also be level in that axis with respect to the global XYZ axes. The side of the alignment shelf 208, and specifically the side member 214, extends vertically to help secure and constrain the accelerometer and keep it in place as the sensor mounting device 200 is being used. The illustrated embodiment shows a single side of the alignment shelf 208 extending perpendicular to the bottom surface 212, but it will be appreciated that a different structure may replace the current angle bracket configuration to further secure the accelerometer or any sensor. Other embodiments may include a U-shaped alignment shelf 208, or an alignment shelf 208 that also includes a top surface to totally encase the accelerometer or other sensor, only leaving a rear surface of the sensor exposed—namely, the sensor surface that is to be glued or otherwise affixed to the component.

It will also be appreciated that the alignment shelf 208 may be modified to accommodate any sensor shape and size, such as a cylindrical sensor, as well as to constrain movement of the sensor with respect to the leveling plate in any number and combination of axes. The shape and structure of the alignment shelf depicted in FIG. 2 shall be construed as a non-limiting example. By way of illustration, the alignment shelf 208 could be a curved structure that cradles an associated cylindrical sensor during placement, alignment, and fixation, or a cylindrical structure that fully constrains the associated cylindrical structure during placement, alignment, and fixation.

Figure 3:
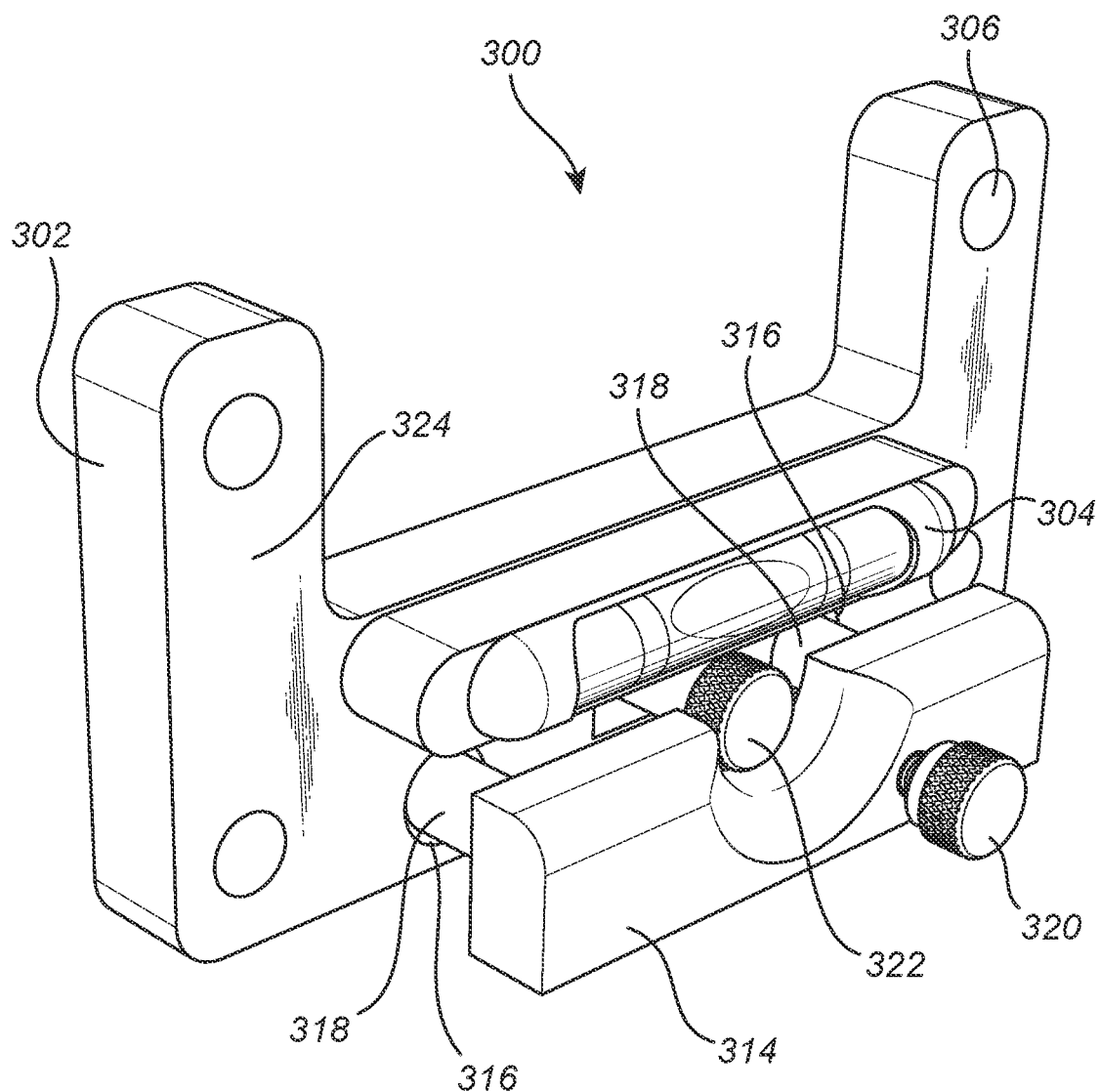
FIG. 3 is a front perspective view of another illustrative embodiment of the sensor mounting device of the present disclosure.

Referring now specifically to FIG. 3, a front perspective view of another illustrative embodiment of the sensor mounting device 300 is shown. The leveling plate 302, which makes up the body of the sensor mounting device 300, includes the level indicator 304, a coupler 314, a plurality of holes 316 formed through the leveling plate 302, and a plurality of adjustment screws 320. The level indicator 304 is again fixed to the front face 324 of the leveling plate 302 via screws, glue, and/or any other form of rigid connection. The level indicator 304 of the present embodiment may again be any type of level indicating device, such as a bubble level. Here, the coupler 314 links a plurality of protruding structures 318 at the front face 324 of the leveling plate 302, which protruding structures 318 are disposed through the leveling plate 302 via the holes 316. The coupler 314 fastens the protruding structures 318 together such that they move collectively and in unison. The protruding structures 318 are extended and retracted through the holes 316 via an adjustment screw 320 engaging the coupler 314. The turning of the adjustment screw 320 causes the coupler 314 to move, thus causing the protruding structures 318 to slide into and out of the holes 316. It will be appreciated that the adjustment screw 320 may be replaced with any other mechanism suitable to extend and retract the plurality of protruding structures 318 in a similar manner. Another adjustment screw 322 is disposed on the front face 324 of the leveling plate 302. This adjustment screw 322 is coupled to a plunger (not shown), both of which make up the plunger assembly, and are disposed through the leveling plate 302 to allow the plunger to extend through the leveling plate 302. This plunger assembly is described in greater detail herein below. A plurality of fastening holes 306 are arranged along the two sides of the leveling plate 302. The plurality of fastening holes 306 are disposed through the leveling plate 302 to allow the sensor mounting device 300 to be fastened to another structure, such as a base.

Figure 4:
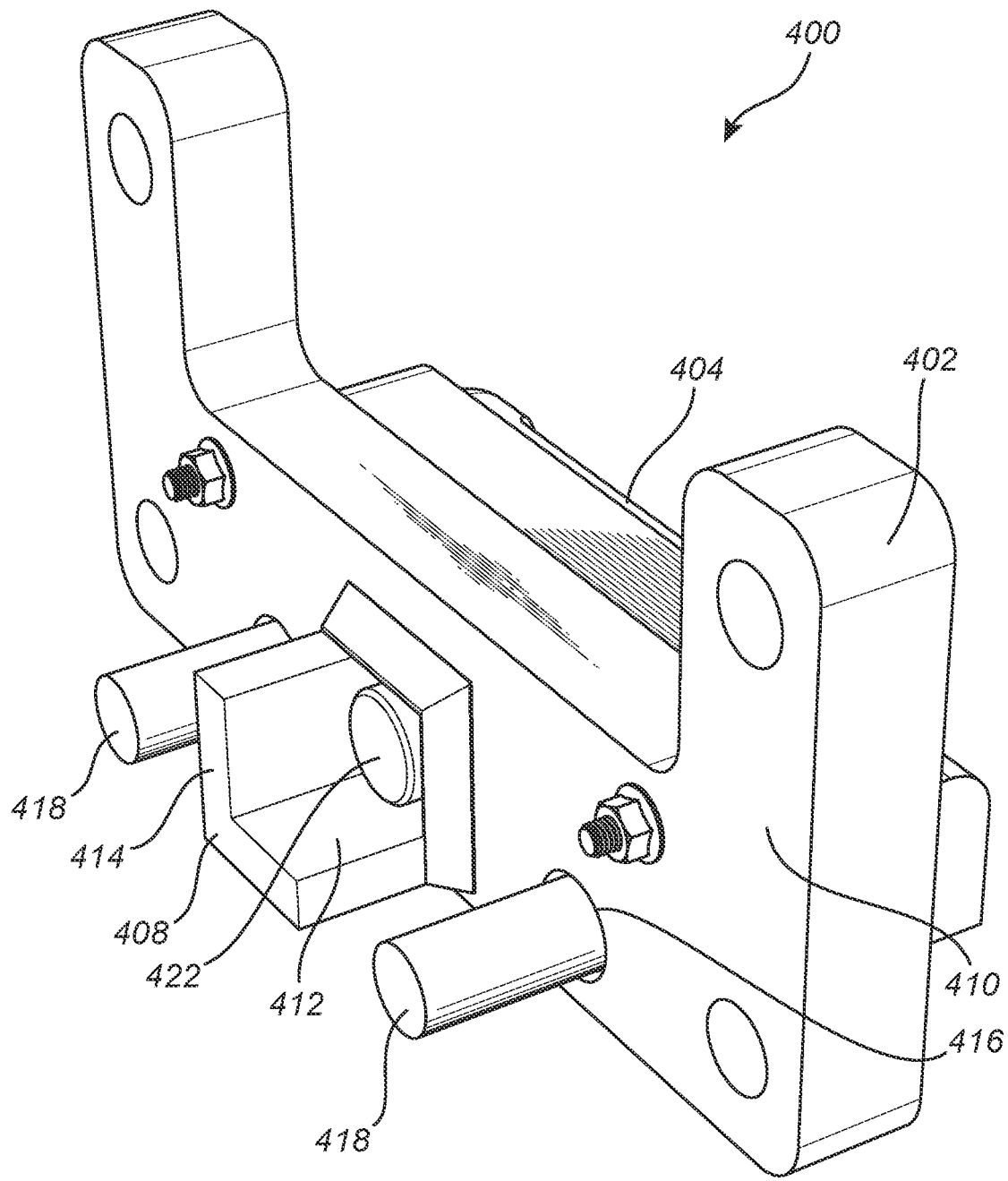
FIG. 4 is a rear perspective view of another illustrative embodiment of the sensor mounting device of the present disclosure.

Referring now specifically to FIG. 4, a rear perspective view of the sensor mounting device 400 of this additional illustrative embodiment is shown. The leveling plate 402 again includes the level indicator 404, the plurality of protruding structures 418, and the plurality of holes 416. The leveling plate further includes the alignment shelf 408 and the plunger 422. The level indicator 404 is again fixed to the front face 324 (FIG. 3) of the leveling plate 402 via screws, glue, and/or any other form of rigid connection. A plurality of fastening holes 406 are again arranged along the two sides of the leveling plate 402. The plurality of fastening holes 406 being disposed through the leveling plate 402 to allow the sensor mounting device 400 to be fastened to another structure such, as a base.

The protruding structures 418 are shown protruding through the leveling plate 402 via the holes 416. The protruding structures 418 shown in FIG. 4 are cylindrical in shape, but may take any shape suitable for the purpose. The protruding structures 418 again are extended and retracted via the corresponding adjustment screw 320 (FIG. 3) on the front face 324 of the leveling plate 402. It will also be appreciated that the protruding structures 418 may be any length and may occupy any extended or retracted position between being flush with the rear face 410 to being fully extended from the rear face 410. The protruding structures 418 are joined by the coupler 314 (FIG. 3), thus fixing the protruding structures 418 together, allowing them to be extended and retracted simultaneously. In the present embodiment, the plurality of protruding structures 418 are extended and retracted collectively via the adjustment screw 320 engaging the coupler 314 (FIG. 3). The protruding structures 418 are configured to hold the leveling plate 402 at a selected distance from the surface to which the sensor is to be affixed. The adjustment of the protruding structures 418 allows the sensor mounting device to be used to mount different sized sensors, as the sensor mounting surface may extend past the alignment shelf 408. The protruding structures 418 are adapted to be extended or retracted to ensure the sensor is mounted perpendicular to the monitored structure surface. In the case of a mounting surface that is not flat or consistent, various embodiments may include protruding structures 418 that are be adapted to be individually extended or retracted as to allow the protruding structures 418 to be adjusted to different lengths.

The alignment shelf 408 is positioned on the rear face 410 of the leveling plate 402. The alignment shelf 408 is designed to hold the sensor, in this example a cube shaped accelerometer, in a constrained or semi-constrained manner. The alignment shelf 408 of the present embodiment includes an angle bracket and includes a bottom member 412 that extends from the rear face 410 of the leveling plate 402 in a horizontal orientation and a side member 414 that extends from the rear face 410 of the leveling plate 402 in a vertical orientation. The bottom member 412 of the angle bracket is manufactured to be level relative to the level indicator 404 thus assuring that when an accelerometer is placed on the alignment shelf 408, the accelerometer and the level indicator 404 are uniformly aligned in at least one axis. This ensures that when the level indicator 404 signifies that it is level, the accelerometer will also be level in that axis with respect to the global XYZ axes. The side of the alignment shelf 408 also extends vertically to help secure the accelerometer and keep it in place as the sensor mounting device 400 is being used. The present embodiment shows a single side of the alignment shelf 408 extending perpendicular to the bottom member 412, but it will be appreciated that a different structure may replace the current angle bracket configuration to further secure the accelerometer or any sensor. Other embodiments may include an alignment shelf 408 that also includes a top surface to totally encase the accelerometer or other sensor, only leaving a rear fixation surface of the sensor exposed. The plunger 422 is positioned relative to the alignment shelf 408 as to contact the accelerometer when articulated. The plunger 422 is disposed through the leveling plate 402 and is adjustable via the corresponding adjustment screw 322 (FIG. 3). Turning the corresponding adjustment screw 322 allows the plunger 422 to extend and retract with respect to the leveling plate 402. This changes the effective depth of the alignment shelf 408 to accommodate for different sized sensors and to extend the sensor from the rear side of the leveling plate towards the surface of the monitored structure along the alignment shelf 408.

It will also be appreciated again that the alignment shelf 408 may be modified to accommodate any shape and size of sensor, such as a cylindrical sensor, and constrain movement of the sensor with respect to the leveling plate 402 in any number and combination of axes. The shape and structure of the alignment shelf 408 depicted in FIG. 4 shall be construed as a non-limiting example.

Figure 5:
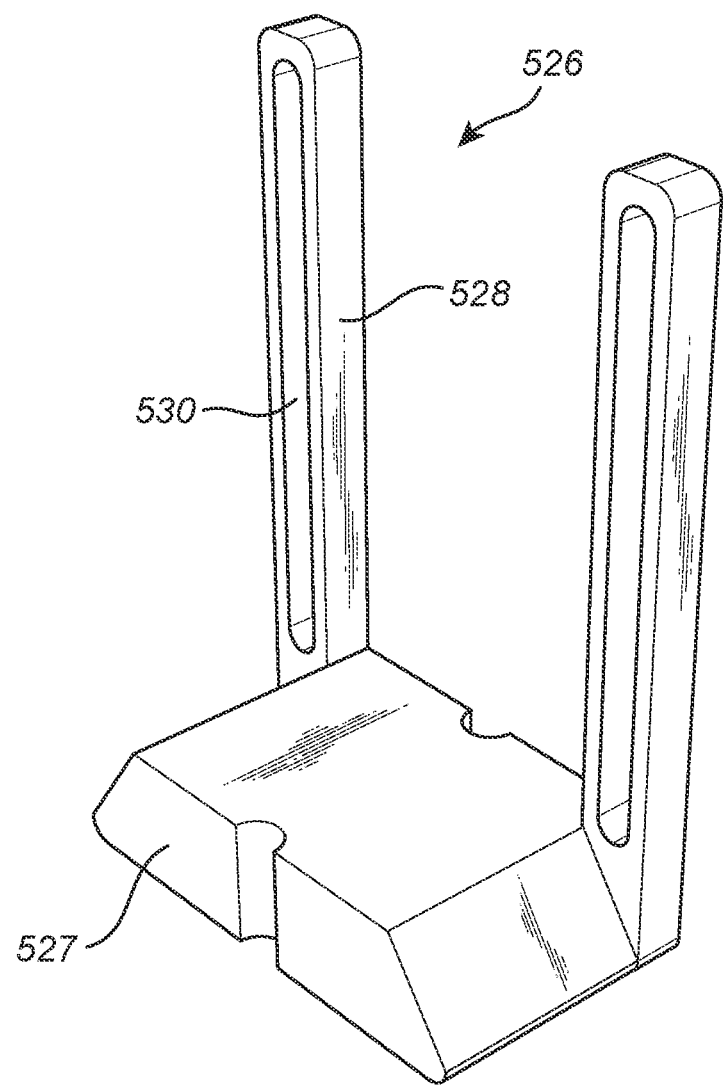
FIG. 5 is a front perspective view of one illustrative embodiment of a base for the sensor mounting device of the present disclosure.

Referring now specifically to FIG. 5, a perspective view of a base structure 526 is presented. The base structure 526 includes a base member 527 and a pair of spanning members 528 extending vertically from the base member 527. The base structure 526 is adapted to have a flat bottom to allow the base structure 526 to sit level on top of a planar surface in case the level indicator is not used or is used for level confirmation only. For example, the base member 527 may be disposed on a vibration table adjacent to the component, with the spanning members 528 extending vertically or at a predetermined angle from the base member, the spanning members 528 holding the leveling plate 402 and sensor during sensor positioning, alignment, and fixation. The spanning members 528 include slots 530 that are disposed through and extend along the length of the spanning members 528. The slots 530 are adapted to line up with the plurality of fastening holes (106 (FIG. 1), 306 (FIG. 3)) disposed in the leveling plate (102 (FIG. 1), 302 (FIG. 3), 402 (FIG. 4)) of the various embodiments. The slots 530 allow the leveling plate (102, 302, 402) to slide along the spanning members 528 and be fixed in a desired vertical position, thus allowing a user to set a desired vertical position to mount the sensor onto the test asset or other monitored structure with the base member 527 disposed adjacent thereto.

In various embodiments, the leveling plate (not shown) may be mounted to the base structure 526. This allows the leveling plate to be aligned level relative to a desired axis and secured to the one or more spanning members 528 at the desired position.

Figure 6:
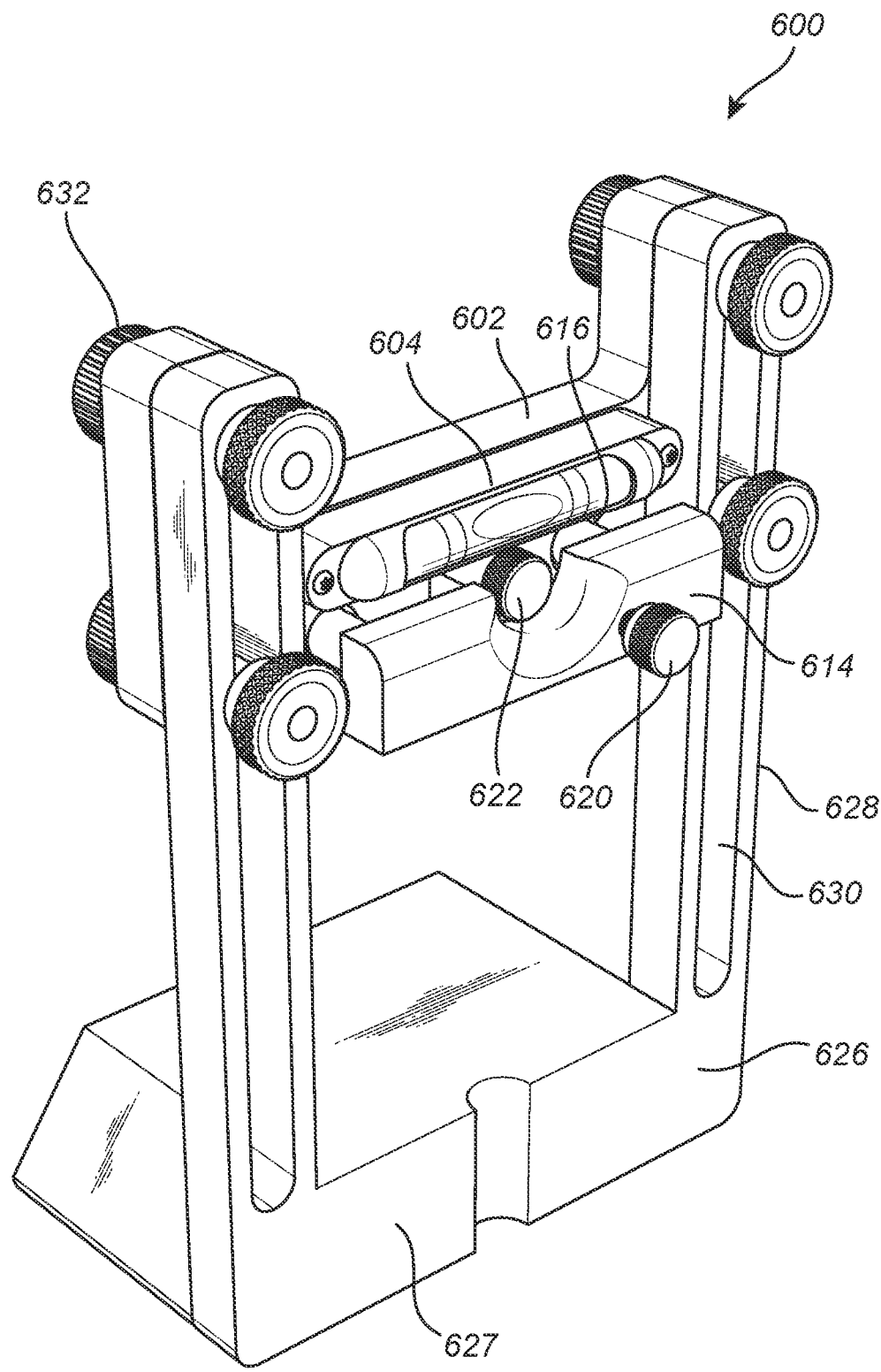
FIG. 6 is a front perspective view of the sensor mounting device of FIGS. 3 and 4 fixed to the base structure of FIG. 5.

Referring now specifically to FIG. 6, a front perspective view of the sensor mounting device 600 of the various embodiments is shown and includes the leveling plate 602 and base structure 626. The leveling plate 602 again includes the level indicator 604, the plurality of fastening holes (not visible), the coupler 614, the plurality of protruding structure holes 616, and the plurality of adjustment screws 620 and 622. The base structure 626 again includes the pair of spanning members 628 extending from the base member 627 and slots 630 that are disposed through and extend along the length of the spanning members 628.

In various embodiments, the leveling plate 602 is attached to the base structure 626 via the plurality of fastening holes (not visible) disposed through the leveling plate 602. The leveling plate 602 is translatably coupled to the base structure 626 with thumb screws 632 or the like inserted through the fastening holes (not visible) and slots 630. The thumb screws 632 may be replaced by any other similar form of attachment suitable for the purpose. This attachment is adapted to allow the leveling plate 602 to slide along the vertical length of the spanning members 628 in a fixed orientation when the thumb screws 632 are loosened, and fixed to a specific position when the thumb screws 632 are tightened. The adjustment of the leveling plate 602 along the base structure 626 allows a user to set a specific height for the accelerometer to be mounted onto the test asset or any other monitored structure.

It will be appreciated that the leveling plate 602 may occupy any position along the length of the one or more spanning members 628. The position of the leveling plate 602 on the base structure 626 depicted in FIG. 6 shall be construed as a non-limiting example.

Figure 7:
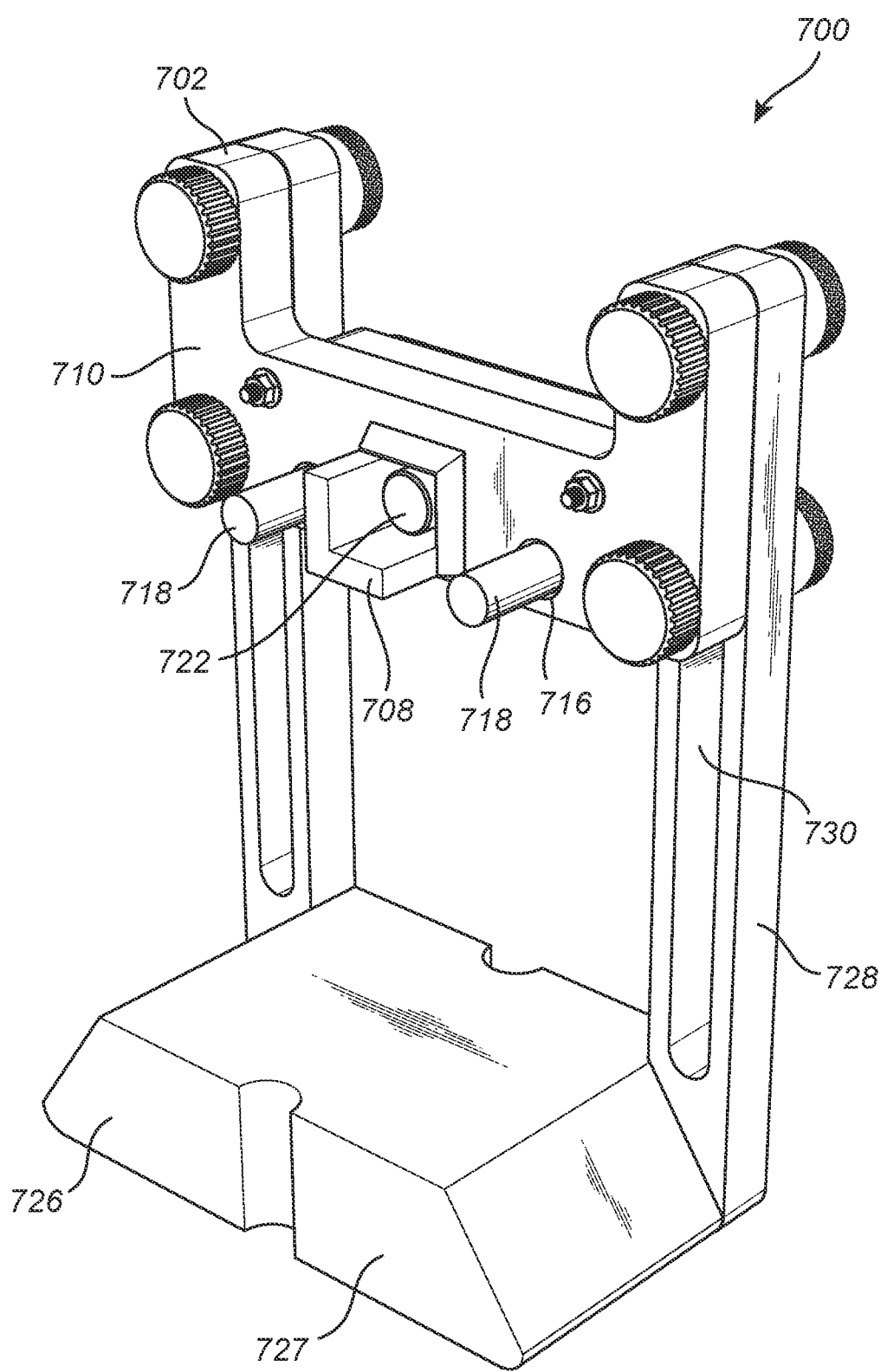
FIG. 7 is a rear perspective view of the sensor mounting device of FIGS. 3 and 4 fixed to the base structure of FIG. 5.

Referring now specifically to FIG. 7, a rear perspective view of the sensor mounting device 700 of various embodiments is shown and again includes the leveling plate 702 and base structure 726. The rear face 710 of the leveling plate 702 again includes the plurality of protruding structures 718, the plurality of holes 716, the alignment shelf 708, and the plunger 722. The base structure 726 again includes the base member and the pair of spanning members 728 extending from the base member 727 and slots 730 that are disposed through and extend along the length of the spanning members 728. The leveling plate 702 is again translatably coupled to the base structure 726.

The sensor mounting device of the present disclosure is described herein with reference to mounting sensors. It will be appreciated that the sensor mounting device of the present disclosure may be used for mounting any alternative device requiring accurate mounting to a surface. Such alternative devices beyond sensors include, for example, a laser projector (e.g., for alignment, etching, welding or other), an imaging device such as a camera or the like, or a plurality of sensors. The plurality of sensors each held and aligned relative to one another.

Figure 8:
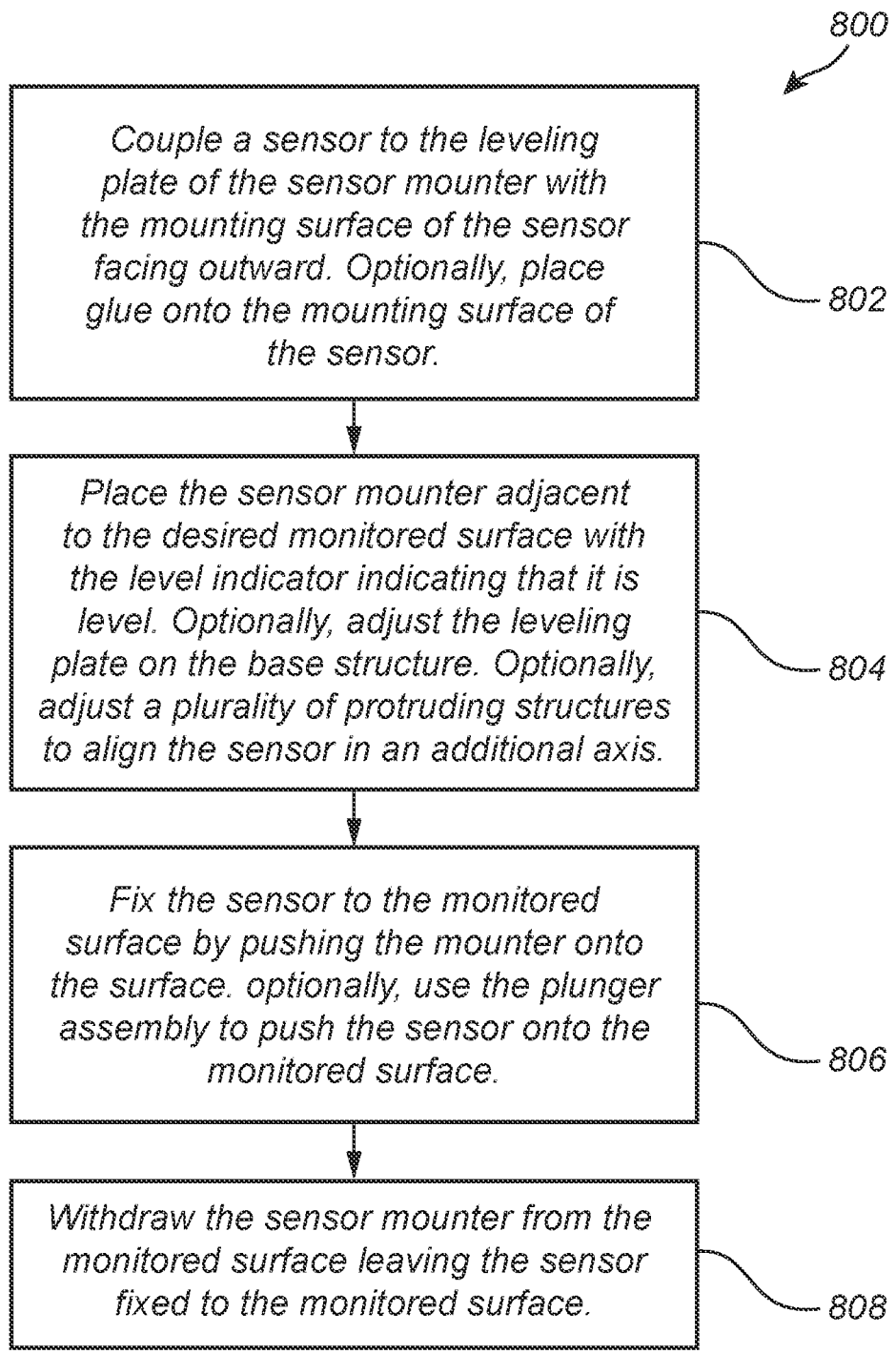
FIG. 8 is a flow chart of one illustrative embodiment of a method for installing a sensor onto a surface of a structure using the sensor mounting device of the present disclosure.

Referring now specifically to FIG. 8, a flow chart of a method 800 for installing a sensors onto the surface of a monitored structure using the sensor mounting device of the present disclosure is presented. The sensor mounting device may include a leveling plate which is defined by a front face and a rear face. The rear face being the surface that is faced towards the monitored structure when the sensor mounting device is being used and the front face being the surface that is faced away from the monitored structure. An alignment shelf may be present on the rear face of the leveling plate to retain the sensor during the mounting procedure and a level indicator may be present on the front face of the leveling plate to indicate when the sensor mounting device is level with at least one axis of the monitored surface. The sensor is first coupled to the sensor mounting device via the alignment shelf in a constrained alignment. (Step 802). The sensor mounting device is then placed adjacent to the surface of the monitored structure while the level indicator is referenced to make sure the sensor mounting device is level in at least one axis with respect to the monitored structure. (Step 804). In various embodiments the leveling plate further includes one or more protruding structures which are extendible from the rear face of the leveling plate. The protruding structures may be disposed against the surface of the monitored structure and adjusted as to cause the sensor to be aligned in at least one additional axis with respect to the monitored structure. The sensor is then fixed to the monitored structure (step 806), using one of a plurality of mounting methods such as adhesive, and the sensor mounting device is withdrawn while leaving the sensor fixed to the monitored structure (step 808). In various embodiments the leveling plate includes a plunger assembly which is used to extend the sensor from the rear side of the leveling plate towards the surface of the monitored structure along the alignment shelf. The sensor mounting device of the current disclosure may further include the use of a base structure wherein the leveling plate is translatably coupled to said base structure via at least one spanning member. With the use of the base member, this method may further include adjusting the leveling plate by translating or rotating it with respect to the at least one spanning member to position the sensor with respect to the surface of the monitored structure before fixing the sensor to the surface of the monitored structure.

Although the present disclosure is illustrated and described herein with reference to illustrative embodiments and specific examples thereof, it will be readily apparent to those of ordinary skill in the art that other illustrative embodiments and examples may perform similar functions and/or achieve like results. All such equivalent illustrative embodiments and examples are within the spirit and scope of the present disclosure, are contemplated thereby, and are intended to be covered by the following non-limiting claims for all purposes.

What is claimed is:

1. A sensor mounting device for mounting a sensor on a surface of a monitored structure, comprising:
    a leveling plate having a rear face adapted to be disposed facing towards the surface of the monitored structure and a front face adapted to be disposed facing along or away from the surface of the monitored structure;
    an alignment shelf coupled to the rear face of the leveling plate and adapted to retain the sensor during mounting to the surface of the monitored structure;
    a level indicator coupled to the leveling plate and visible from the front face of the leveling plate; and
    a plunger assembly coupled to the leveling plate and operable for extending the sensor from the rear face of the leveling plate towards the surface of the monitored structure along the alignment shelf, wherein the plunger assembly is actuatable from other than the rear face of the leveling plate.

2. The sensor mounting device of claim 1, wherein the level indicator is operable for ensuring that the leveling plate is level in at least one axis with respect to the surface of the monitored structure.

3. The sensor mounting device of claim 1, wherein the alignment shelf comprises an angle bracket that is adapted to constrain movement of the sensor with respect to the leveling plate in at least one direction along each of two perpendicular axes.

4. The sensor mounting device of claim 3, wherein the alignment shelf and the leveling plate are collectively adapted to constrain movement of the sensor with respect to the leveling plate in at least one direction along each of three orthogonal axes.

5. The sensor mounting device of claim 1, further comprising a base structure adapted to be disposed on a planar structure disposed adjacent to the monitored structure.

6. The sensor mounting device of claim 5, further comprising at least one spanning member coupled to the base structure, wherein the leveling plate is translatably and or rotatably coupled to the at least one spanning member.

7. The sensor mounting device of claim 1, further comprising protruding structures coupled to the rear face of the leveling plate and disposed on opposed sides of the alignment shelf, wherein the protruding structures are adapted to hold the leveling plate parallel to or in a predetermined alignment with the surface of the monitored structure.

8. The sensor mounting device of claim 7, wherein the protruding structures are extendible from the front face of the leveling plate.

9. A method for mounting a sensor on a surface of a monitored structure, comprising:
    coupling the sensor to a sensor mounting device comprising a level indicator in a constrained alignment;
    disposing the sensor mounting device adjacent to the surface of the monitored structure with the level indicator indicating that the sensor mounting device is level in at least one axis with respect to the surface of the monitored structure;
    extending the sensor from the sensor mounting device towards the surface of the monitored structure a using a plunger assembly coupled to the sensor mounting device;
    affixing the sensor to the surface of the monitored structure; and
    withdrawing the sensor mounting device while leaving the sensor affixed to the surface of the monitored structure.

10. The method of claim 9, wherein the sensor mounting device further comprises:
    a leveling plate having a rear face adapted to be disposed facing towards the surface of the monitored structure and a front face adapted to be disposed facing along or away from the surface of the monitored structure; and an alignment shelf coupled to the rear face of the leveling plate and adapted to retain the sensor during mounting to the surface of the monitored structure;

wherein the level indicator is coupled to the leveling plate and is visible from the front face of the leveling plate.

11. The method of claim 10, wherein the alignment shelf comprises an angle bracket that is adapted to constrain movement of the sensor with respect to the leveling plate in at least one direction along each of two perpendicular axes.

12. The method of claim 11, wherein the alignment shelf and the leveling plate are collectively adapted to constrain movement of the sensor with respect to the leveling plate in at least one direction along each of three orthogonal axes.

13. The method of claim 10, wherein the sensor mounting device further comprises a base structure, and wherein the method further comprises disposing the base structure on a planar structure disposed adjacent to the monitored structure.

14. The method of claim 13, wherein the sensor mounting device further comprises at least one spanning member coupled to the base structure, wherein the leveling plate is translatably and or rotatably coupled to the at least one spanning member, and wherein the method further comprises translating the leveling plate with respect to the at least one spanning member to position the sensor with respect to the surface of the monitored structure.

15. The method of claim 10 wherein the sensor mounting device further comprises protruding structures coupled to the rear face of the leveling plate and disposed on opposed sides of the alignment shelf, wherein the protruding structures are adapted to hold the leveling plate parallel to or in a predetermined alignment with the surface of the monitored structure, and wherein the method further comprises adjusting the protruding structures to hold the leveling plate parallel to or in a predetermined alignment with the surface of the monitored structure.

16. The method of claim 10, wherein the sensor mounting device further comprises the plunger assembly coupled to the leveling plate, wherein the plunger assembly is actuatable from other than the rear face of the leveling plate, and wherein the method further comprises extending the sensor from the rear face of the leveling plate towards the surface of the monitored structure along the alignment shelf using the plunger assembly.

17. The method of claim 9, wherein affixing the sensor to the surface of the monitored structure comprises affixing the sensor to the surface of the monitored structure using an adhesive.

18. A sensor mounting device for mounting a sensor on a surface of a monitored structure, comprising:
 a leveling plate having a rear face adapted to be disposed facing towards the surface of the monitored structure and a front face adapted to be disposed facing along or away from the surface of the monitored structure;
 an alignment shelf coupled to the rear face of the leveling plate and adapted to retain the sensor during mounting to the surface of the monitored structure;
 a level indicator coupled to the leveling plate and visible from the front face of the leveling plate; and
 a plunger assembly coupled to the leveling plate and operable for extending the sensor from the rear face of the leveling plate towards the surface of the monitored structure along the alignment shelf, wherein the plunger assembly is actuatable from other than the rear face of the leveling plate;
 wherein the alignment shelf and the leveling plate are collectively adapted to constrain movement of the sensor with respect to the leveling plate in at least one direction along each of three orthogonal axes.

19. The sensor mounting device of claim 18, wherein the alignment shelf comprises one of an angle bracket and a curved bracket.

* * * * *